United States Patent
Grover

(10) Patent No.: US 9,868,353 B2
(45) Date of Patent: Jan. 16, 2018

(54) IN-VEHICLE CONFIGURABLE SOFT SWITCHES

(71) Applicant: Ford Global Technologies, LLC, Dearborn, MI (US)

(72) Inventor: Joey Ray Grover, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 536 days.

(21) Appl. No.: 14/148,201

(22) Filed: Jan. 6, 2014

(65) Prior Publication Data

US 2015/0193030 A1 Jul. 9, 2015

(51) Int. Cl.
*B60K 35/00* (2006.01)
*B60K 37/06* (2006.01)
*G01C 21/36* (2006.01)

(52) U.S. Cl.
CPC .............. *B60K 35/00* (2013.01); *B60K 37/06* (2013.01); *B60K 2350/10* (2013.01); *B60K 2350/1016* (2013.01); *B60K 2350/1032* (2013.01); *G01C 21/3661* (2013.01)

(58) Field of Classification Search
CPC ................................. G06F 3/14; G08C 17/02
USPC ......... 701/36, 2; 455/556.1, 562.1, 557, 566
See application file for complete search history.

(56) References Cited

U.S. PATENT DOCUMENTS

| | | | | |
|---|---|---|---|---|
| 4,787,040 A * | 11/1988 | Ames | ................. | B60H 1/00985 345/504 |
| 6,009,355 A * | 12/1999 | Obradovich | ....... | B60G 17/0195 340/815.4 |
| 6,832,142 B2 * | 12/2004 | Busse | ....................... | G06F 3/14 701/36 |
| 7,324,833 B2 * | 1/2008 | White | ................ | G06Q 30/0267 455/556.1 |
| 7,634,228 B2 * | 12/2009 | White | ................ | G06Q 30/0267 455/3.05 |
| 2001/0016789 A1 * | 8/2001 | Staiger | ................ | B60R 16/0231 701/1 |
| 2004/0090315 A1 * | 5/2004 | Mackjust | .............. | B60R 25/104 340/426.13 |
| 2010/0234071 A1 * | 9/2010 | Shabtay | ............... | H04B 7/0408 455/562.1 |
| 2014/0088794 A1 * | 3/2014 | Yashiro | .................. | G08C 17/02 701/2 |
| 2014/0201004 A1 * | 7/2014 | Parundekar | ........ | G06Q 30/0265 705/14.62 |
| 2015/0066292 A1 * | 3/2015 | Macfarlane | ........... | B60W 10/06 701/36 |

* cited by examiner

*Primary Examiner* — Thomas G Black
*Assistant Examiner* — Wae Louie
(74) *Attorney, Agent, or Firm* — Jennifer M. Stec; Brooks Kushman P.C.

(57) ABSTRACT

A computer-implemented method may include receiving input to a vehicle-associated computing system (VACS) touch-sensitive display, requesting adjustment to a powered state of an accessory device connected to a switch module; providing, responsive to the input, a command from a vehicle computing system to the switch module, running on the VACS, to adjust a controlled output of the switch module; and updating the user interface to reflect a result of the command.

20 Claims, 7 Drawing Sheets

IN-VEHICLE CONFIGURABLE SOFT SWITCHES

TECHNICAL FIELD

The present disclosure generally relates to vehicle infotainment systems, and more particularly, to systems and methods of providing configurable switching of in-vehicle devices.

BACKGROUND

U.S. Pat. No. 7,324,833 generally discloses an audio system and method. A system may include, for example, an electronic device having a display, a memory, an audio file player, and a housing component at least partially defining a cavity in which the memory and the audio file player are secured. In one embodiment, the electronic device may be a portable MP3 player. The system may also include a processor or playlist engine that can maintain a first playlist and a second playlist. In practice, the first playlist may include a selection of audio content having a corresponding audio file saved in the memory of the electronic device. In one embodiment, the system may also include an automobile having an automobile sound system that has a speaker and an in dash sound system component, which may be removably coupled to the electronic device via a cable. The in dash sound system component may have a selector, which may be, for example, a button, that allows a user to select the first playlist for outputting via the speaker. The cable interconnecting the electronic device and the in dash sound system component may be capable of providing power to the electronic device in addition to communicatively coupling the electronic device to the automobile sound system.

U.S. Pat. No. 7,634,228 generally discloses a media managing method. A method links a graphical interface soft button with a media file saved in a memory system of a portable electronic device, maintains a collection of information that represents the graphical interface soft button in the memory system, and communicates at least some of the collection to a different electronic device in order to allow a user to view a representation of the graphical interface soft button on an associated display of the different electronic device. The method further receives a signal to begin playing the media file in response to a selection of the representation.

U.S. Pat. No. 8,346,312 generally discloses a vehicle-based computing apparatus including a computer processor in communication with persistent and non-persistent memory. The apparatus also includes a local wireless transceiver in communication with the computer processor and configured to communicate wirelessly with a wireless device located at the vehicle. The processor is operable to receive, through the wireless transceiver, a connection request sent from a nomadic wireless device, the connection request including at least a name of an application seeking to communicate with the processor. The processor is further operable to receive at least one secondary communication from the nomadic device, once the connection request has been processed. The secondary communication is at least one of a speak alert command, a display text command, a create phrase command, and a prompt and listen command.

U.S. Pat. No. 6,832,142 generally discloses an electronic system that includes a plurality of electronic components and a central control unit. The electronic components and the central control unit are connected to each other by a bus structure. The central control unit includes a memory. The electric and functional parameters of each electronic component are stored in the memory. Functions may be selected by the central control unit and according to the electric and functional parameters of all of the electronic components. The selection may be displayed for the user by a central graphic interface. The electronic components may be exclusively controlled by the central control unit.

SUMMARY

In a first illustrative embodiment, a computer-implemented method includes receiving input to a vehicle-associated computing system (VACS) touch-sensitive display, requesting adjustment to a powered state of an accessory device connected to a switch module; providing, responsive to the input, a command from a vehicle computing system to the switch module, running on the VACS, to adjust a controlled output of the switch module; and updating the display to reflect a result of the command.

In a second illustrative embodiment, a system includes a switch module configured to utilize an active low design to provide switched ground wire connections to a plurality of accessory devices; receive a command from a vehicle-associated computing system requesting adjustment to a powered state of one of the plurality of accessory devices connected to the switch module; and adjust the powered state of the one of the plurality of accessory devices responsive to the command.

In a third illustrative embodiment, a non-transitory computer readable medium comprising instructions configured to cause at least one controller to receive input to a vehicle-associated computing system (VACS) touch-sensitive display, requesting adjustment to a powered state of an accessory device connected to a switch module; provide, responsive to the input, a command from a vehicle computing system to the switch module, running on the VACS, to adjust a controlled output of the switch module; and update the display to reflect a result of the command.

DETAILED DESCRIPTION

Figure 1:
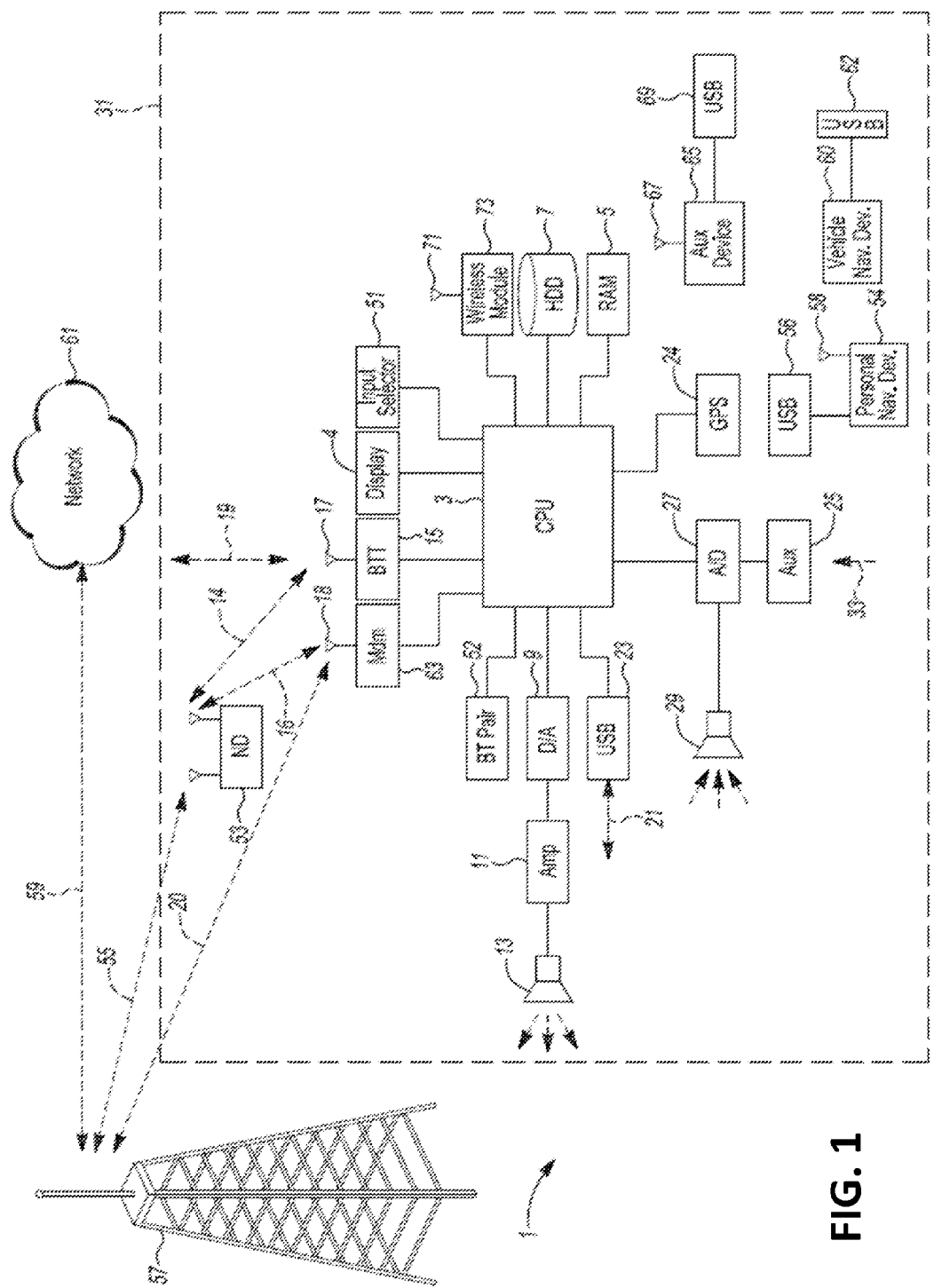
FIG. 1 is an exemplary block topology of a vehicle infotainment system implementing a user-interactive vehicle information display system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A user may wish to add accessories to a vehicle that are powered by the vehicle electrical system. For example, the user may wish to add additional ambient lighting or video playback devices to the vehicle cabin. Adding aftermarket accessories to a vehicle usually involves modifying the vehicle so that the user can turn the accessories on or off. For example, if a user wishes to add accent lighting to the vehicle, the user may be required to drill a hole into the vehicle dash for mounting a toggle switch to control the powered state of the accent lights. Or, the user may avoid adding the switch by allowing the wires to the accessories to be manually wired in, but such an approach is unsightly and unsafe.

A vehicle system may include a switch module that switches power to accessory devices under the control of a vehicle computing system. The user may wire an accessory device to a positive terminal of a vehicle power source, and to an available controlled output ground of the switch module. The switch module may utilize an active low design, to provide switched ground wire connections to accessory devices rather than switching the power line, allowing the switch module to complete the circuit for the accessory device when a command is received to do so.

Once wired, the vehicle system may display a soft-switch user interface including a listing of switches or connected accessory devices. From the interface, the system may receive input via the soft-switch user interface requesting the system to power on or power off the accessory device from the indicated accessory devices. As one example, a user may provide input to a touch screen or voice input to a vehicle computing system. As another example, a user may provide the input to the vehicle computing system via a smartphone or other device in communication with the vehicle computing system. The soft-switch user interface may further include indications of the power status of the accessory devices, such as which devices are currently powered on and which devices are powered off.

Based on the received user input, the vehicle control system may be configured to send commands to the switch module to perform actions such as: power an accessory device on, power an accessory device off, toggle power to a specified accessory device, power on all accessories, or power off all accessories. In some cases, the switch module may be configured to perform two-way communication with the vehicle control system. For example, a two-way switch module may be configured to provide acknowledgement of sent commands, as well as result codes regarding success or failure of the requested commands. These acknowledgement or result codes may be utilized by the soft-switch user interface to update the status in the user interface of which devices are currently powered, as well as to report errors in the user interface.

Thus, by using the switch module and soft-switch user interface, a user may be able to wire up and power accessory devices, without making hardware modifications to the vehicle to support switching power to the added accessory devices.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
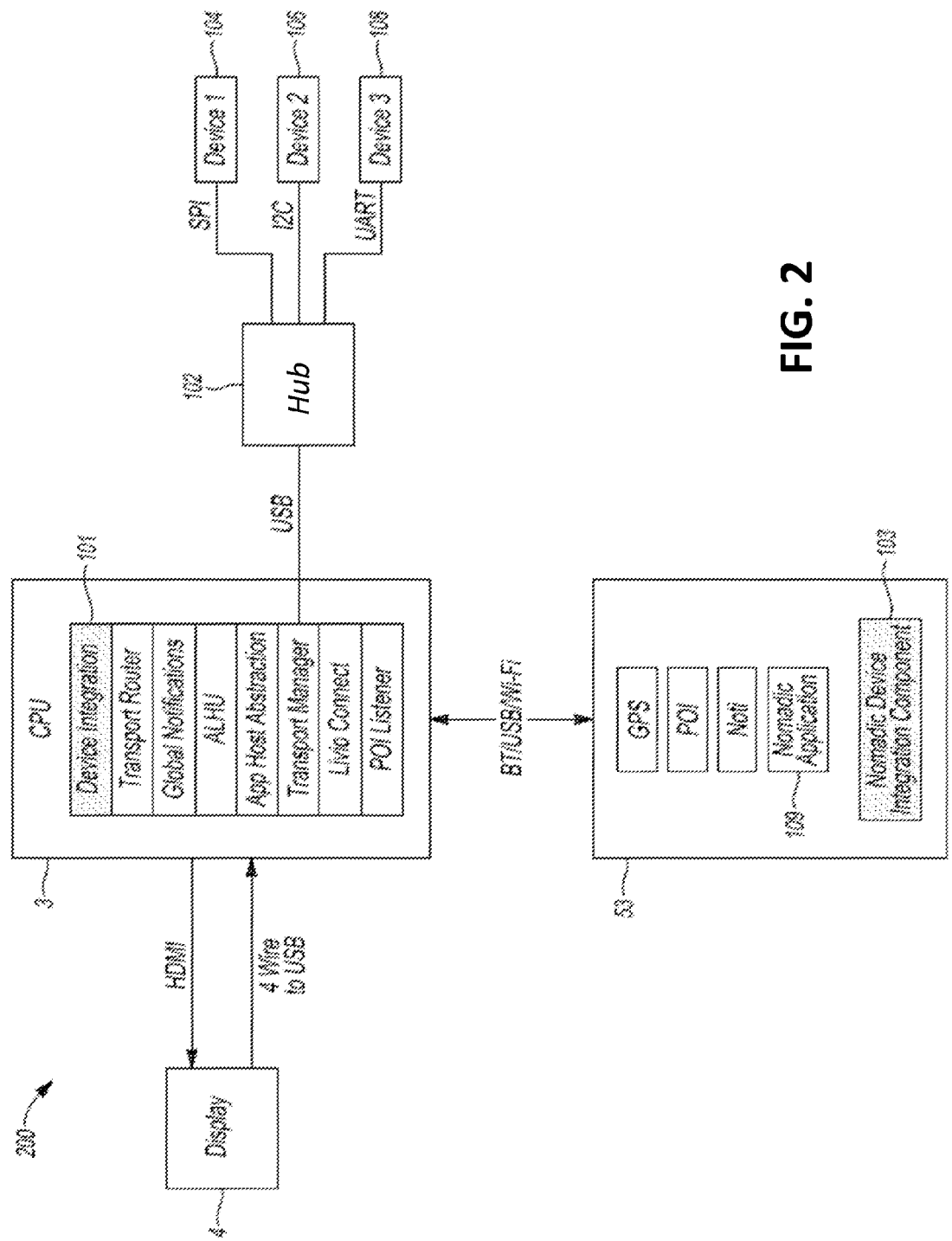
FIG. 2 is an exemplary block topology of an example system for integrating one or more nomadic devices with an infotainment system.

FIG. 2 is an exemplary block topology of a system for integrating one or more connected devices with the vehicle based computing system 1 (VCS). To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101. Applications executed by the nomadic device 53 may accordingly utilize the device integration client component 103 to interact with the CPU 3 via the device integration framework 101. As one example, a music player application on the nomadic device 53 may interact with the CPU 3 to provide streaming music through the speaker 13 or stereo system output of the VCS 1. As another example, a navigation application on the nomadic device 53 may interact with the CPU 3 to provide turn-by-turn directions for display on the screen 4 of the VCS 1.

The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Figure 3:
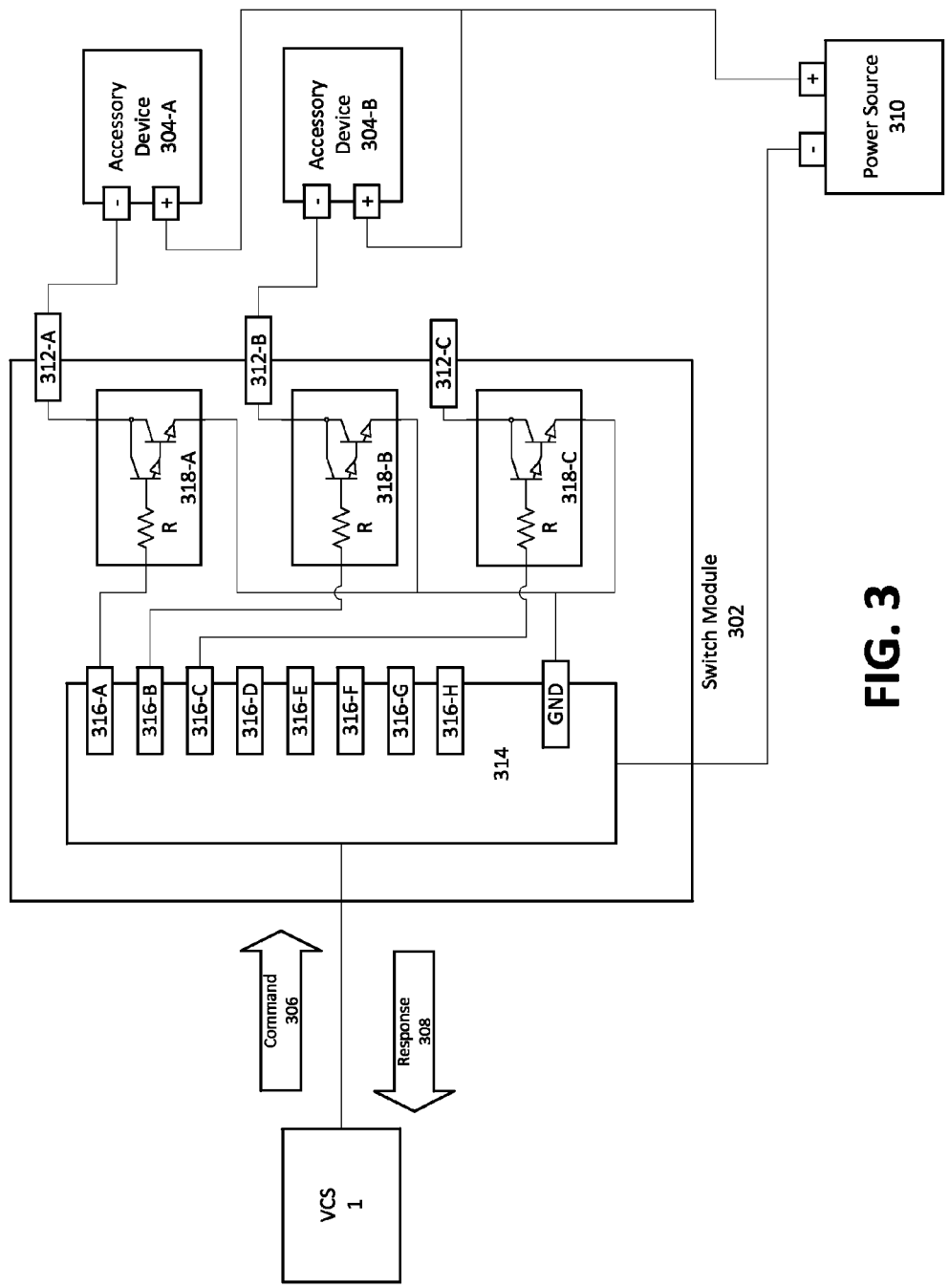
FIG. 3 is an exemplary block diagram of a switch module providing power control to accessory devices.

FIG. 3 is an exemplary block diagram of a switch module 302 providing power control to accessory devices 304. The switch module 302 may be connected to the VCS 1, e.g., via the hub 102 or via connection to the CPU 3 without use of the hub 102, e.g., via a USB connection. The switch module 302 may be configured to receive commands 306 from the VCS 1 to cause the switch module 302 to control power to the accessory devices 304. In some cases, the switch module 302 may be configured to provide responses 308 to the VCS 1 regarding the status of the commands 306 processed by the switch module 302.

The accessory devices 304 may include various types of powered accessories, such as aftermarket lighting or video playback devices added to the vehicle 31 passenger compartment. To set up an accessory device 304 to be controlled, the user may wire the positive of the accessory device 304 to the positive of a vehicle power source 310 (e.g., a 12 Volt battery of the vehicle 31), and the negative to an available controlled output 312 of the switch module 302. The switch module 302 may accordingly utilize an active low design, to expose switched ground wire connections to the accessory devices 304 rather than switching the power line. As illustrated, the switch module 302 includes three controlled outputs 312-A, 312-B, and 312-C, with accessory device 304-A wired to controlled output 312-A, and accessory device 304-B wired to controlled output 312-B. However, it should be noted that the switch module 302 may have more or fewer controlled outputs 312, and that more or fewer accessory devices 304 may be wired to the switch module 302.

Once wired to the power source 310 and switch module 302, the switch module 302 may be able to complete the circuit from the accessory device 304 to ground when a command 306 is received to do so. As one exemplary implementation, the switch module 302 may include a controller 314 with a plurality of controller signal outputs 316, as well as a plurality of power control modules 318 connected to the controller signal outputs 316. The controller 314 may include a microprocessor or other computing device configured to decode received commands 306, identify an operation to be performed and which accessory device(s) 304 for which the operation is to be performed, and raise or reset signals to the controller signal outputs 316 of the controller 314.

Upon the controller 314 raising a signal to a controller signal output 316 associated with the accessory device 304 to power, the power control modules 318 may to close the circuit to ground for a connected accessory device 304. The controller 314 may be implemented, as one possibility, as an Arduino single-board microcontroller or other controller board or device. The power control modules 318 may be implemented, for example, as a TIP 120 Darlington transistor, with the base connected to a switched output of the Arduino board through a 2.2 K Ohm resistor, the emitter connected to ground, and the collector connected to an associated available controlled output 312. In other examples, the power control modules 318 may be implemented using a relay, other type of transistor or transistors, or another switching device capable of completing the circuit to the accessory device 304 as commanded by the controller 314. In yet further examples, the controller 314 may be capable of supporting switching to the controlled outputs 312 directly, without requiring use of power control modules 318.

As one exemplary implementation, a command 306 may include information such as a switch number value indicating the controlled output 312 to be controlled by the command 306, and a switch action value indicating the action to be performed for the indicated controlled outputs 312 (e.g., a first value specifying to force power off independent of the current powered state, a second value specifying to force power on independent of the current powered state, a third value to toggle the current powered on/off state, etc.). Variations on the command 306 protocol are possible. For example, the command 306 protocol may include switch actions values that power all controlled outputs 312 on or off, or that toggle all controlled outputs 312. As another example, commands 306 may include multiple switch number and switch action pairs to provide multiple commands 306 in a single command packet. For light control, dimming levels may also be requested in the command 306 as switch actions, which may be implemented by the controller 314 by performing pulse width modulation of the controlled outputs 312.

In some cases, the switch module 302 may be configured to provide a response 308 back to the sender of the command 306. The response 308 may include various information, such as an acknowledgement indicating that the command 306 was successful, a current state of the controlled output 312 as adjusted by the command 306 (e.g., useful for toggle commands 306), an non-acknowledgement indicating that the command 306 was unsuccessful, and a reason tag for unsuccessful commands 306 including a reason that the command 306 was unsuccessful (e.g., invalid switch number, invalid switch action, unable to parse command 306 packet, no accessory device 304 connected to the requested switch number, etc.). In other cases, however, such as due to limitations in the features supported by the controller 314, the switch module 302 may not respond to commands 306 with a response 308, but may be configured to provide responses 308 to requests regarding whether specific controlled outputs 312 are powered on or off. In yet further cases, the switch module 302 may not be configured to support two-way communication at all, and therefore may not provide any responses 308 or notifications. Instead, to maintain state a user of the switch module 302 may maintain powered on or off status for the controlled outputs 312 based on assuming success of any sent commands 306.

Figure 4A:
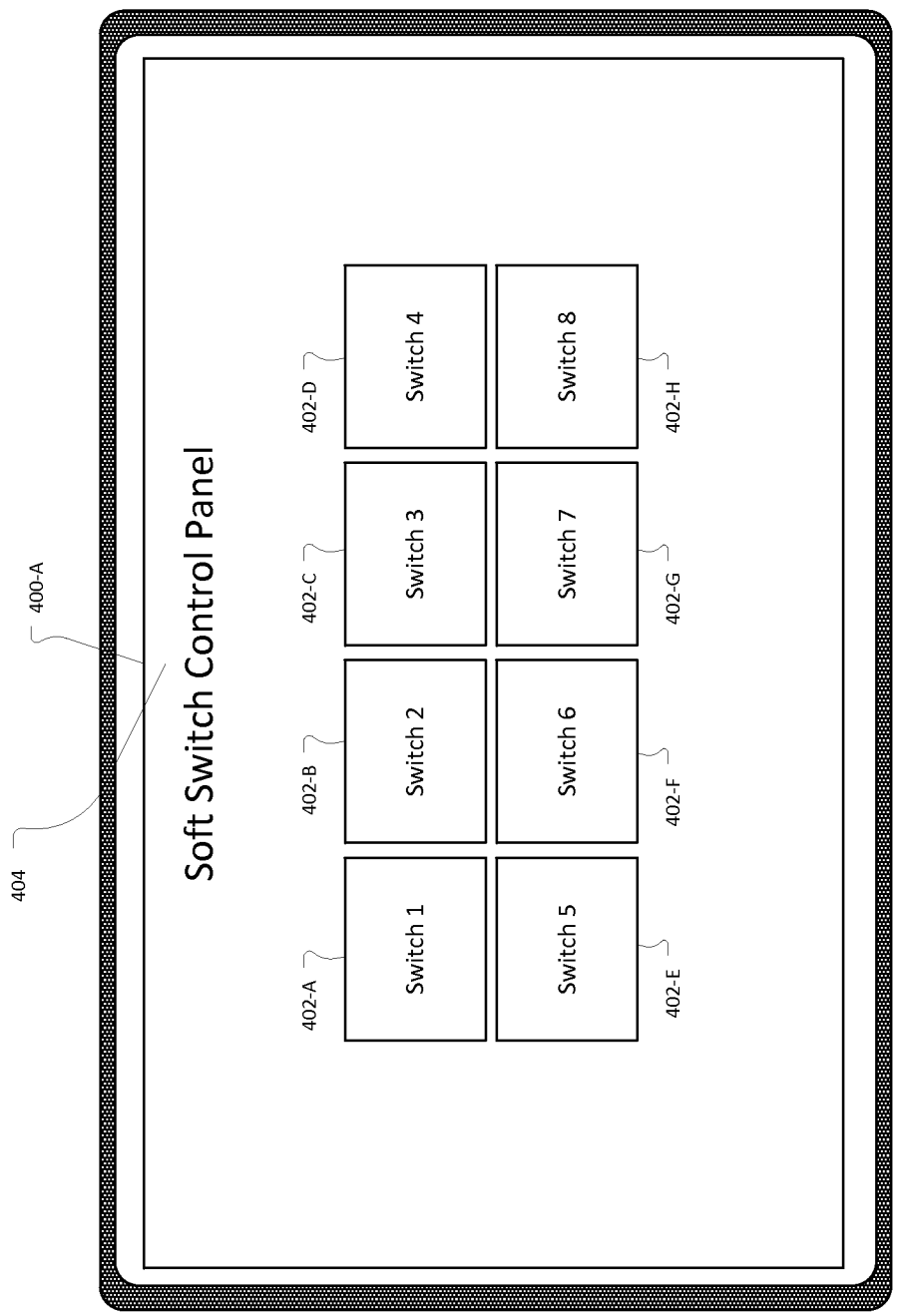
FIG. 4A illustrates an exemplary soft switch user interface for the control of accessory devices.

FIG. 4A illustrates an exemplary soft switch user interface 400-A for the control of accessory devices 304 using the switch module 302. The user interface 400-A may be presented, for example, on a screen 4 of the VCS 1 controlled by the CPU 3. As another example, the user interface 400-A may be provided by a nomadic application 109 on a screen of a nomadic device 53 connected to the VCS 1. As shown, the user interface 400-A includes a plurality of switch control elements 402-A through 402-H (collectively 402) and a label element 404 indicating that the user interface 400-A provides for switched control of the accessory devices 304. Each switch control element 402 may be configured to control an associated one of the controlled outputs 312 of the switch module 302. As some examples, the switch control element 402-A labeled "Switch 1" may be configured to allow a user to toggle the powered state of an accessory device 304-A connected to the controlled output 312-A of the switch module 302, and the switch control element 402-B labeled "Switch 2" may be configured to allow a user to toggle the powered state of an accessory device 304-B connected to the controlled output 312-B of the switch module 302.

Upon selection of a switch control element 402, the VCS 1 may be configured to provide a command 306 to the switch module 302 to change the powered state of an accessory device 304 associated with the selected element 402. For example, upon receiving indication of a user touch to a switch control element 402 presented in the user interface 400-A on a touch display 4, the CPU 3 may generate a command 306 specifying the controlled output 312 associated with the selected element 402, and an action to change the state of the specified controlled output 312 (e.g., a toggle action, an off action if the current state of the controlled output 312 is determined to be powered, an on action if the current state of the controlled output 312 is determined to be unpowered, etc.). The generated command 306 may accordingly be provided by the CPU 3 to the switch module 302 for processing and control of the specified controlled output 312. Thus, by using the switch module 302 and user interface 400-A, a user may be able to wire up and power accessory devices, without making hardware modifications to the vehicle 31 to support switching power to the added accessory devices 304.

The switch module 302 may process the command 306 as discussed above with respect to FIG. 3. In some examples, the switch module 302 may provide a response 308 back to the CPU 3. The CPU 3 may accordingly use the response 308 to update maintained information regarding the current state of the controlled outputs 312. It should also be noted that in other cases, the CPU 3 may maintain a current state of the controlled outputs 312 based on the sent commands 306, assuming success. Or, the CPU 3 may simply provide toggle commands 306, which may not require the CPU 3 to maintain the current status of the controlled outputs 312.

Figure 4B:
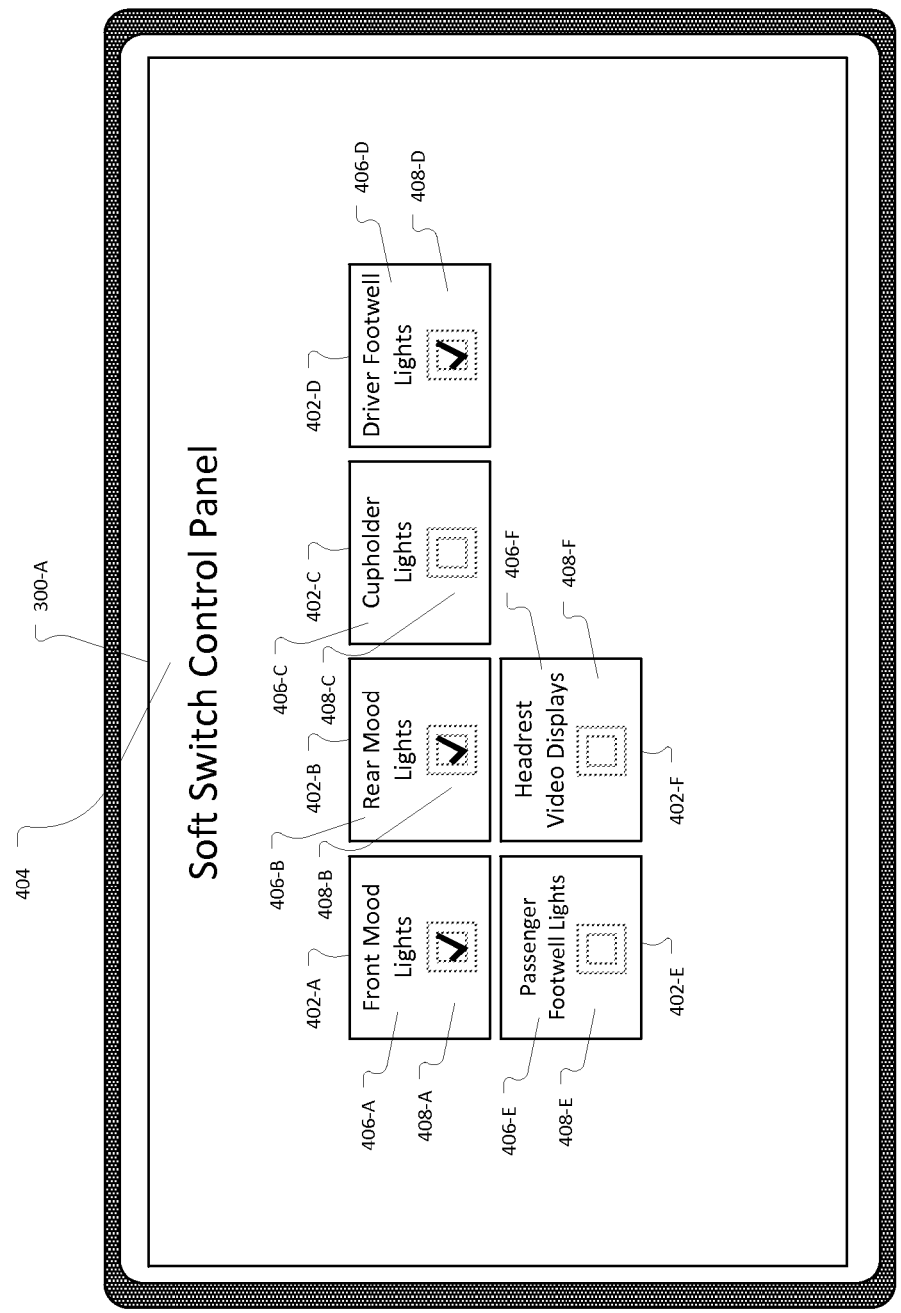
FIG. 4B illustrates an alternate exemplary soft switch user interface for the control of accessory devices including status indications and configurable labels.

FIG. 4B illustrates an alternate soft switch exemplary user interface 400-B for the control of accessory devices 304 including configurable labels 406 and status indications 408. Each of the switch control elements 402 of the user interface 400-B may be associated a corresponding configurable label 406 (i.e., rather than the predefined textual labels illustrated in the user interface 400-A), and status indication 408 indicative of the currently powered status of the labeled accessory device 304.

The configurable labels 406 may be customizable to allow the switch control elements 402 of the user interface 400-B to be more descriptive of the controlled accessory devices 304. For example, the user interface 400-B may receive input from the user selecting an edit mode in which the configurable labels 406 are user editable. Based on the input indicative of a desire to edit a selected configurable label 406, the user interface 400-B in edit mode may present an editable control in which the current text for a selected configurable label 406 may be changed or replaced. Moreover, in edit mode the user interface 400-B may also allow the user to reorder the switch control elements 402 to appear in an order other than connection order to the controlled outputs 312 of the switch module 302. The VCS 1 may accordingly maintain information mapping the ordering of the switch control elements 402 to the controlled outputs 312 of the switch module 302 to aid in controlling the correct connected accessory devices 304. Yet further, in edit mode the user interface 400-B may also allow the user to hide switch control elements 402 for which no accessory devices 304 are connected (e.g., as illustrated only six switch control elements 402 are visible in the user interface 400-B as compared to the eight that are visible in the user interface 400-A). To ensure vehicle 31 safety, edit mode may be disabled when the vehicle 31 is in motion.

As another possibility, if the switch module 302 detects a change in the connected accessory devices 304 (e.g., a change in load or other electrical properties indicative of an accessory device 304 now being connected to one of the controlled outputs 312 of the switch module 302 that was previously open), the VCS 1 may receive detection of the change from the switch module 302, and may provide a message in the user interface 400-B suggesting that the user enter label edit mode or may provide a prompt in the user interface 400-B requesting text to use as the label for the newly connected accessory device 304.

The status indications 408 may illustrate the currently powered or unpowered status of the switch control element 402 with which it is associated. As shown, the status indications 408 illustrate checkmarks to indicate powered accessory devices 304. For instance, the status indication 408-A is checked to illustrate that the front mood lights are powered, the status indication 408-B is checked to illustrate that the rear mood lights are powered, and the status indication 408-D is checked to illustrate that the driver footwell lights are powered. Moreover, the status indications 408 illustrate a lack of a checkmarks to indicate unpowered accessory devices 304. For instance, the status indication 408-C is unchecked to illustrate that the cupholder lights are not powered, the status indication 408-E is unchecked to illustrate that the passenger footwell lights are not powered, and the status indication 408-F is unchecked to illustrate that the headrest video displays are not powered. Notably, these illustrated status indications 408 are merely exemplary, and other visualizations may be used. As some other possibilities, lights may be shown as illuminated to indicate powered devices and dark to indicate unpowered devices, or the word ON may be utilized to indicate powered devices and the word OFF to indicate unpowered devices.

Figure 4C:
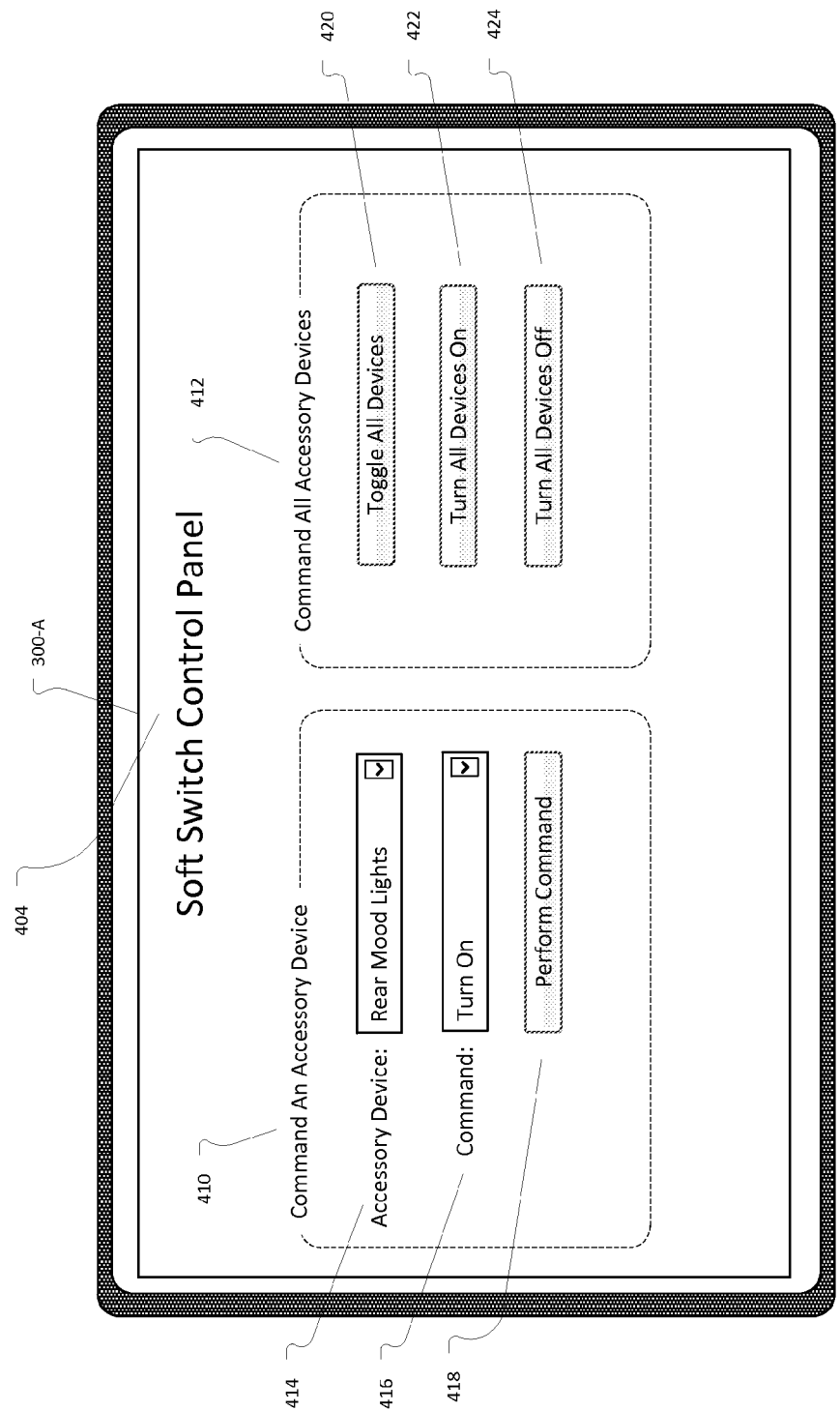
FIG. 4C illustrates an alternate exemplary soft switch user interface for the control of accessory devices from a nomadic device.

FIG. 4C illustrates an exemplary soft switch user interface 400-C for the control of accessory devices 304 from a nomadic device 53. The user interface 400-C may include controls for commanding a specified accessory device 410, as well as controls for commanding all accessory devices 412.

The controls for commanding a specified accessory device 410 may include an accessory device 304 dropdown control 414 for specifying an accessory device 304 to which to send a command 306, a command 306 dropdown control 416 from which to select a command 306, and a perform command control 418 configured to command the switch module 302 provide the selected command 306 to the selected accessory device 304. The switch module 302 may be commanded by the nomadic device 53, for example, by the nomadic device 53 sending a message to the CPU 3 to cause the CPU 3 to create the command 306 to be send to the switch module 302.

The controls for commanding all accessory devices 412 may include a toggle all devices control 420 configured to command the switch module 302 send a toggle command 306 to each of the connected accessory devices 304, a turn all devices on control 422 configured to command the switch module 302 to send an on command 306 to each of the connected accessory devices 304, and a turn all devices off control 422 configured to command the switch module 302 to send an off command 306 to each of the connected accessory devices 304.

Figure 5:
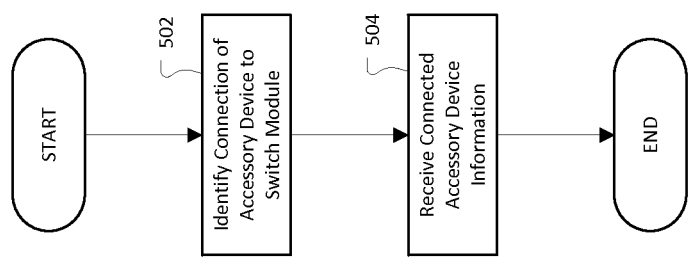
FIG. 5 illustrates an exemplary process for connecting an accessory device to the switch module.

FIG. 5 illustrates an exemplary process 500 for configuring an accessory device 304 connected to the switch module 302. The process 500 may be performed, for example, by a CPU 3 of a VCS 1 of a vehicle 31 in communication with a switch module 302 and, in some examples, with a nomadic device 53. In other embodiments, the process 600 may be implemented in other controllers, or distributed amongst multiple controllers.

At block 502, the VCS 1 identifies that an accessory device 304 has been connected to the switch module 302. As one possibility, the switch module 302 may detect a change in the connected accessory devices 304 (e.g., a change in load or other electrical properties indicative of an accessory device 304 now being connected to one of the controlled outputs 312 of the switch module 302 that was previously open). As another possibility, a user interface 400 of the VCS 1 (e.g., presented via visual display 4, nomadic device 53, etc.) may receive an input from a user of the VCS 1 indicating that an accessory device 304 was wired to a controlled output 312 of the switch module 302, or indicating that the user wishes to edit the information regarding the connected accessory devices 304.

At block 504, the VCS 1 receives information regarding the connected accessory devices 304. For example, a user interface 400 of the VCS 1 (e.g., presented via visual display 4, nomadic device 53, etc.) may receive input from a user of the VCS 1 indicating text for a configurable label 406 that may be used in the user interface 400 to describe one of the connected accessory devices 304. The user interface 400 may also allow the user to reorder the switch control elements 402 to appear in an order other than connection order to the controlled outputs 312 of the switch module 302. Yet further, the user interface 400 may also allow the user to hide switch control elements 402 for which no accessory devices 304 are connected. To ensure vehicle 31 safety, these edit mode functions may be disabled when the vehicle 31 is in motion. After block 504, the process 500 ends.

Figure 6:
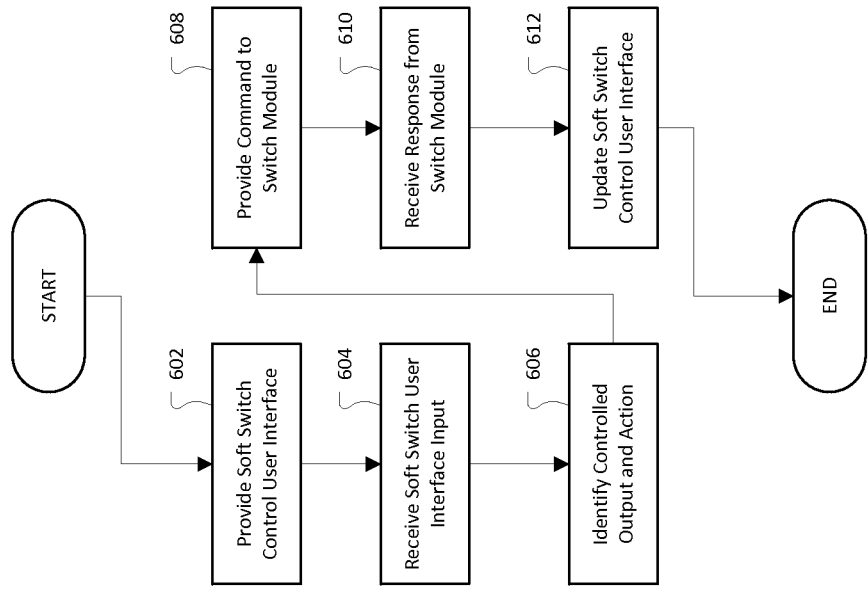
FIG. 6 illustrates an exemplary process for controlling an accessory device using a switch module.

FIG. 6 illustrates an exemplary process 600 for controlling an accessory device using a switch module 302. As with the process 500, the process 600 may be performed, for example, by a CPU 3 of a VCS 1 of a vehicle 31 in communication with a switch module 302 and, in some examples, with a nomadic device 53. In other embodiments, the process 600 may be implemented in other controllers, or distributed amongst multiple controllers.

At block 602, the VCS 1 presents a soft switch user interface 400. The soft switch user interface 400 may be provided, for example, responsive to user input to the VCS 1 to invoke switch functionality of the VCS 1. The user interface 400 may be presented, for example, on a screen 4 of the VCS 1 controlled by the CPU 3. As another example, the user interface 400 may be provided by a nomadic application 109 on a screen of a nomadic device 53 connected to the VCS 1. Exemplary user interfaces 400 may include the user interfaces 400-A, 400-B and 400-C discussed in detail above.

At block 604, the VCS 1 receives user interface input via the soft switch user interface 400. For example, a user may select a switch control element 402 from the user interface 400-A or user interface 400-B to request the VCS 1 to adjust the powered state of an accessory device 304 associated with the selected switch control element 402. As another example, the user may select an accessory device 304 and command 306 using controls for commanding a specified accessory device 410 of a user interface 400-C, or may select a command 306 to be provided to all accessory devices 304 using a controls for commanding all accessory devices 412 of the user interface 400-C.

At block 606, the VCS 1 identifies a controlled output 312 of the switch module 302 associated with the accessory device 304 to control, and the action to be performed. As an example, the CPU 3 may determine which controlled output 312 of the switch module 302 is associated with the selected switch control element 402 of the user interface 400-A by determining which numbered selected switch control element 402 was selected. As another example, the CPU 3 may look up which controlled output 312 of the switch module 302 is associated with the selected switch control element 402 of the user interface 400-B, e.g., according to maintained information about the mapping of the ordering of the switch control element 402 to the controlled outputs 312 of the switch module 302. As a further example, a nomadic device 53 displaying the user interface 400-C may identify the appropriate controlled outputs 312 based on the selection from the dropdown control 414 specifying an accessory device 304 (and the maintained information about the mapping of the ordering). As yet a further example, if one of the commands 306 to be provided to all accessory devices 304 is invoked, then the command 306 may accordingly implicate all connected accessory devices 304.

At block 608, the VCS 1 provides a command 306 to the switch module 302. For example, the VCS 1 may be configured to generate a command 306 in a command 306 protocol such as discussed above with respect to FIG. 3. The switch module 302 accordingly performs the provided command 306. For example, as discussed above with respect to FIG. 3, the switch module 302 may receive the command 306 and may adjust the powered state of the connected accessory devices 304 responsive to the command 306.

At block 610, the VCS 1 optionally receives a response 308 to the switch module 302. For example, the switch module 302 may optionally be configured to provide a response 308 to the VCS 1 regarding the status of the command 306 received by the switch module 302. The response 308 may include various information, such as an acknowledgement indicating that the command 306 was successful, a current state of the controlled output 312 as adjusted by the command 306 (e.g., useful for toggle commands 306), an non-acknowledgement indicating that the command 306 was unsuccessful, and a reason tag for unsuccessful commands 306, such as an indication of a reason that the command 306 was unsuccessful (e.g., invalid switch number, invalid switch action, unable to parse command 306 packet, no switch detected/connected to the requested switch number, etc.). In some cases, rather than receiving a response to the command 306, the VCS 1 may be configured to request a response 308 from the switch module 302 requesting the current powered status of the controlled output 312 being controlled by the command 306. In cases in which responses 308 are not received, such as for controllers 314 that do not support two-way communication, the VCS 1 may instead maintain the current state of the controlled outputs 312 assuming success of the command 306.

At block 612, the VCS 1 updates the user interface 400. For example, the VCS 1 may update a status indication 408 in the user interface 400-B to indicate the toggled powered state of the selected accessory device 304 switched according to the provided command 306. As another example, the VCS 1 may update a status indication 408 in the user interface 400-B based on whether or not a successful response 308 is received from the switch module 302. As yet a further example, the VCS 1 may update a status indication 408 in the user interface 400-B based on querying the switch module 302 for a current powered status of the controlled output(s) 312 to which the accessory device(s) 304 targeted by the command 306 are connected. After block 612, the process 600 ends.

Referring again to FIGS. 5 and 6, the vehicle 31 and its components illustrated in FIGS. 1-4 are referenced throughout the discussion of the processes 500 and 600 to facilitate understanding of various aspects of the present disclosure. The processes 500 and 600 may be implemented through a computer algorithm, machine executable code, or software instructions programmed into a suitable programmable logic device(s) of the vehicle, such as the vehicle control module, the hybrid control module, another controller in communication with the vehicle computing system, or a combination thereof. Although the various steps shown in the processes 500 and 600 appear to occur in a chronological sequence, at least some of the steps may occur in a different order, and some steps may be performed concurrently or not at all.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A computer-implemented method comprising:
   prompting, in a touch display of a vehicle, for label text to identify an accessory device detected due to a change in electrical properties of a controlled output of a switch module;
   providing, responsive to touch input to the label text of the display requesting adjustment to a powered state of the accessory device, a command adjusting the controlled output; and
   updating the display to reflect a result of the command.

2. The method of claim 1, further comprising updating a status indication of the display associated with the accessory device to reflect the powered state of the accessory device upon adjustment.

3. The method of claim 1, further comprising updating the display based on a response received from the switch module indicative of the result of the command to the switch module to adjust the controlled output.

4. The method of claim 1, the command specifying an action including one of to: power on the accessory device, power off the accessory device, and toggle the powered state of the accessory device.

5. The method of claim 1, further comprising identifying the controlled output corresponding to the accessory device according to maintained information mapping switch control elements of the display to indications of controlled outputs of the switch module.

6. The method of claim 5, further comprising receiving input including at least one of: input indicating text for a configurable label to describing the accessory device, input indicating the mapping of switch control elements of the display to indications of controlled outputs of the switch module, and input indicating to hide switch control elements for which no accessory devices are connected.

7. The method of claim 1, wherein the touch display includes at least one of a display of a nomadic device connected to a vehicle computing system or a display of the vehicle computing system.

8. A system comprising:
   a switch module configured to:
      utilize an active low design to provide switched ground wire connections to a plurality of accessory devices;
      receive a command from a vehicle-associated computing system requesting adjustment to a powered state of one of the plurality of accessory devices connected to the switch module; and adjust the powered state of the one of the plurality of accessory devices responsive to the command.

9. The system of claim 8, wherein the switch module is further configured to provide a response to the vehicle computing system indicating a result of the command.

10. The system of claim 8, the command specifying an action including one of to: power on the accessory device, power off the accessory device, and toggle the powered state of the accessory device.

11. The system of claim 8, the command specifying an action including one of to: power on all of the plurality of accessory devices, power off all of the plurality of accessory devices, and toggle the powered state of all of the plurality of accessory devices.

12. The system of claim 8, the switch module including a controller with a plurality of controller signal outputs and a plurality of power control modules, such that each of the plurality of power control modules is connected to one of the controller signal outputs and one of the plurality of accessory devices to allow the controller to independently complete a ground connection between each of the plurality of accessory devices and ground.

13. The system of claim 8, wherein the vehicle-associated computing system includes a nomadic device in communication with a vehicle computing system, wherein the command is provided to the vehicle computing system from the nomadic device.

14. The system of claim 8, further comprising a display device of a vehicle-associated computing system configured to:

receive input requesting adjustment to the powered state of the accessory device connected to the switch module; and update the display to reflect a result of the command.

15. A non-transitory computer readable medium comprising instructions configured to cause at least one controller to:

receive, from a switch module, an indication of detection by the switch module of a change in electrical properties of a controlled output of the switch module, the change indicative of an accessory device being connected to the controlled output;

provide a message in a user interface of a vehicle-associated computing system (VACS) touch-sensitive display requesting text to use as a label in the display for the accessory device;

receive input to the label in the display, requesting adjustment to a powered state of the accessory device;

provide, responsive to the input, a command from a vehicle computing system to the switch module, running on the VACS, to adjust a controlled output of the switch module; and update the display to reflect a result of the command.

16. The computer readable medium of claim 15, further comprising updating a status indication of the display associated with the accessory device to reflect the powered state of the accessory device upon adjustment.

17. The computer readable medium of claim 15, further comprising updating the display based on a response received from the switch module indicative of the result of the command to the switch module to adjust the controlled output.

18. The computer readable medium of claim 15, the command specifying an action including one of to: power on the accessory device, power off the accessory device, and toggle the powered state of the accessory device.

19. The computer readable medium of claim 15, further comprising identifying the controlled output corresponding to the accessory device according to maintained information mapping switch control elements of the display to indications of controlled outputs of the switch module.

20. The computer readable medium of claim 19, further comprising receiving input including at least one of: input indicating text for a configurable label to describe the accessory device, input indicating the mapping of switch control elements of the display to indications of controlled outputs of the switch module, and input indicating to hide switch control elements for which no accessory devices are connected.

* * * * *